United States Patent [19]

Anderson et al.

[11] Patent Number: 4,662,800
[45] Date of Patent: May 5, 1987

[54] GRAIN AND FERTILIZER COLLECTOR

[75] Inventors: Mike K. Anderson; Barry L. DieBold; Norman F. Cutforth; Dean J. Cutforth, all of Claresholm, Canada

[73] Assignee: Rem Manufacturing Ltd., Swift Current, Canada

[21] Appl. No.: 630,798

[22] Filed: Jul. 13, 1984

[30] Foreign Application Priority Data

Jun. 13, 1984 [CA] Canada ................................. 456,445

[51] Int. Cl.[4] ..................... B65G 53/48; B65G 53/60
[52] U.S. Cl. ...................................... 406/53; 55/290; 210/402; 406/171
[58] Field of Search .................. 406/169, 53, 171; 210/402; 55/290

[56] References Cited

U.S. PATENT DOCUMENTS

| 1,564,980 | 12/1925 | Singer | 406/171 X |
| 3,060,512 | 10/1962 | Martin et al. | 406/53 |
| 3,891,550 | 6/1975 | Gray et al. | 210/402 X |
| 4,299,603 | 11/1981 | Friesen | 55/290 |
| 4,344,723 | 8/1982 | Ellingson | 406/53 |

FOREIGN PATENT DOCUMENTS 384365 10/1939 Canada .
756474 4/1967 Canada .
960991 1/1975 Canada .
1101380 5/1981 Canada .
2089754 6/1982 United Kingdom .

Primary Examiner—Jeffrey V. Nase
Assistant Examiner—L. E. Williams
Attorney, Agent, or Firm—Sughrue, Mion, Zinn, Macpeak and Seas

[57] ABSTRACT

A particulate vacuum collector device comprises a generally closed housing 74 including a bottom portion 140 particulate material and air inlet 90 and an air outlet 84, the inlet and outlet being above the bottom portion and the air outlet being adapted to be connected with an air suction generator 40. A perforated drum 160 within the housing screens air flow between the inlet and the air outlet while particulate material gravity falls to the bottom portion. A particulate material outlet 220 is separate from the inlet and is associated with the bottom portion of the collector. An auger 210 is provided for conveying material from the bottom portion to the material outlet, such outlet including a door 224 which prevents air from entering the housing during start-up operation of the device and which, in conjunction with some material being conveyed to the outlet for discharge outside the device, creates an air lock to substantially prevent air entering the housing through the material outlet while material is being collected and discharged.

3 Claims, 7 Drawing Figures

GRAIN AND FERTILIZER COLLECTOR

This invention relates to a device for moving or transferring particulate material such as grains from one location to another and more particularly, pertains to a device wherein air suction means causes the particulate material to be conveyed from one location to a collector wherein the material is consolidated for delivery from the collector, preferably by auger means.

BACKGROUND OF THE INVENTION

The transfer of loose bulk, particulate material from one location to another is known, particularly with respect to the use of pneumatic suction conveying means or auger conveying means. By way of example, Canadian Pat. No. 384,365 granted Oct. 3, 1939 to Holly provides a truck vehicle to which particulate material is conveyed by suction means created by an air pump whereafter the truck may deliver the material to some other location with the assistance of forced air created by the air pump. Further, Canadian Pat. No. 960,991 pertains to an elevating and conveying system for unloading a vessel including a suction system which transports material from the vessel in one generally vertical pipe and disposes it for conveyance within a second generally horizontal pipe, a reduction in pneumatic flow velocity being achieved between the pipes.

Other known grain transport systems use cyclone separators with air lock rotors separating the vacuum (collection) and pressure (delivery) sides of the system.

The above systems are large and involve somewhat sophisticated equipment with attendant costs and are not suited for relatively small operations, one which could be directed to individual farmers or the like in transferring particulate materials such as grains or fertilizer from one location to another or to containers.

SUMMARY OF THE INVENTION

The invention pertains to a particulate vacuum collector device comprising a generally closed housing including a bottom portion, particulate material and air inlet means and air outlet means, the inlet means and air exhaust means being above the bottom portion and the air outlet means being adapted to be connected with air suction generating means. Means within the housing screen air flow between the inlet means and the air outlet means while particulate material gravity falls to the bottom portion. Particulate material outlet means is separate from the inlet means and is associated with the bottom portion of the collector. Means are provided for conveying material from the bottom portion to a material outlet means, the material outlet means including means which prevents air from entering the housing during start-up operation of the device and which, in conjunction with some material being conveyed to the outlet means for discharge outside the device, creates an air lock to substantially prevent air entering the housing through the material outlet means while material is being collected and discharged.

PREFERRED EMBODIMENTS OF THE INVENTION

Figure 1:
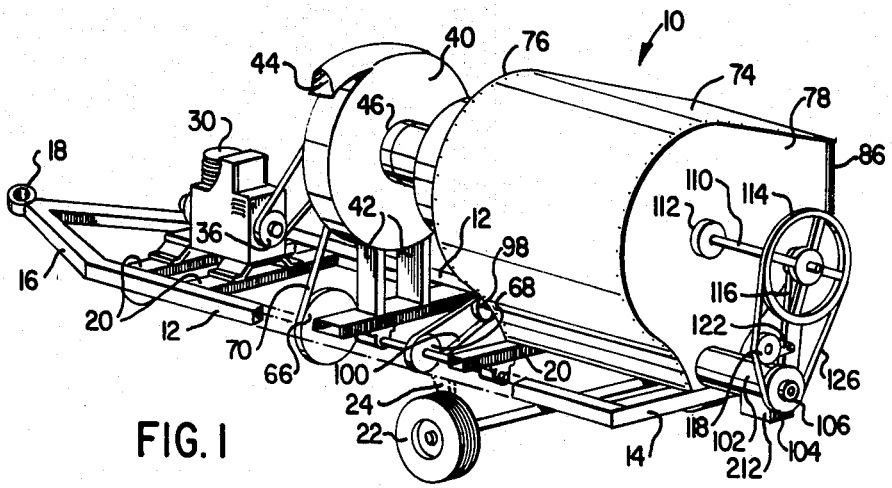
FIG. 1 is a perspective view of a grain or fertilizer collector device mounted on a trailer frame in conjunction with an engine and suction fan.

Referring now to the drawings of the invention, FIG. 1 shows a collector 10 mounted on a trailer frame having longitudinal side frame members 12 with lateral end frame member 14. Forward frame members 16 join and provide a mounting for trailer hitch 18. Cross frame members 20 extend between side frame members 12 and provide support means with respect to apparatus carried by the trailer. Trailer wheels 22 are mounted by wheel supports 24 extending downwardly from side frame members 12. A forward support wheel 26, which may be retractable from a lower to an upper position, allows for the trailer to be retained in a horizontal position when not attached to a tractor or like device.

Engine 30 is supported by support means 32 on two cross frame members 20. Engine 30 includes output shaft 34 having pulley 36 secured thereto. Suction fan 40 is mounted via support 42 to a cross frame member 20. Fan 40 includes an air outlet 44 and an air suction inlet 46, drive shaft 48 being appropriately mounted to drive an impeller inside fan 40 and having pulley 50 secured to the free end thereof. Pulley belt 52 provides drive connection between engine pulley 36 and a fan pulley 50. Also fixedly secured to shaft 48 is pulley 54.

A drive transmission assembly 60 includes shaft 62 apropriately mounted in bearings 64 which bearings 64 are secured to two cross frame members 20. Drive assembly 60 includes a first pulley 66 and a second pulley 68 with pulley belt 70 drivingly connecting the drive assembly 60 to pulley 54 of suction fan 40.

The description of the trailer, engine and suction fan has been brief since further details are not essential for an understanding of this invention.

Collector 10 includes peripheral housing portion 74 with ends 76 and 78 secured thereto by suitable means such as nut/bolt means 80. End portion 76 includes outlet housing 82 which in turn has a diametrically smaller outlet 84 providing means for suitable connection with fan suction inlet 46. Housing portion 74 includes neck portion 86 to which is secured a planar front plate 88 having flanged aperture 90 to which a flexible hose 92 is appropriately coupled.

A rotatable shaft 94 suitably journalled at 96 extends outwardly from a lower portion of end 76 and has pulley 98 secured thereto. Pulley belt 100 provides drive connection with pulley 68 of drive assembly 60 and indirectly with engine 30 through the other pulleys and pulley belts previously referred to.

Secured to and extending from the bottom of opposite end 78 of collector 10 is cylindrical housing 102 having end plate 104 closing the outer end. Shaft 94 extends through the bottom of housing portion 74 and through housing 102 and extends from housing end plate 104. Pulley 106 is secured to this end of shaft 94. A shaft 110 extends outwardly from end 78 of collector 10 through bearing means 112. Shaft 110 has pulley 114 secured to its free end and shaft 110 is supported by support means 116 extending upwardly from the end plate 104. Suitable bearing means 118 on support 116 provide for rotational support of shaft 110 adjacent pulley 114. A tension pulley 118 is rotatably supported in suitable bearings 120 by bracket 122 extending from end plate 104 which bracket is suitably mounted to end plate 102 for biased movement to provide tension to belt 126, belt 126 providing drive from shaft 94 to shaft 110 via respective pulleys 106 and 114.

Figure 2:
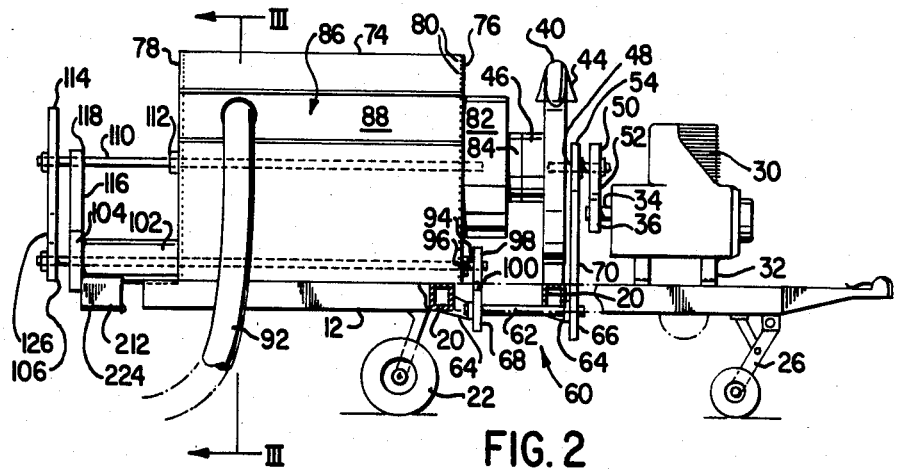
FIG. 2 is an elevational view from the opposite side of the structure shown in FIG. 1.
Figure 3:
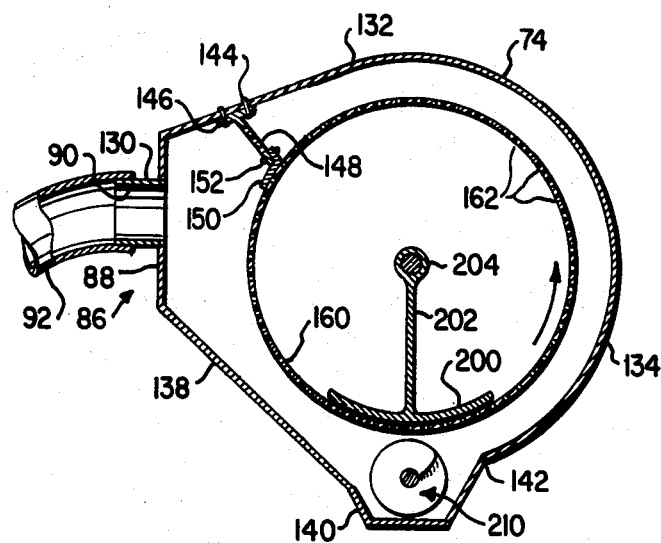
FIG. 3 is a sectional view taken along line 3—3 of FIG. 2.
Figure 4:
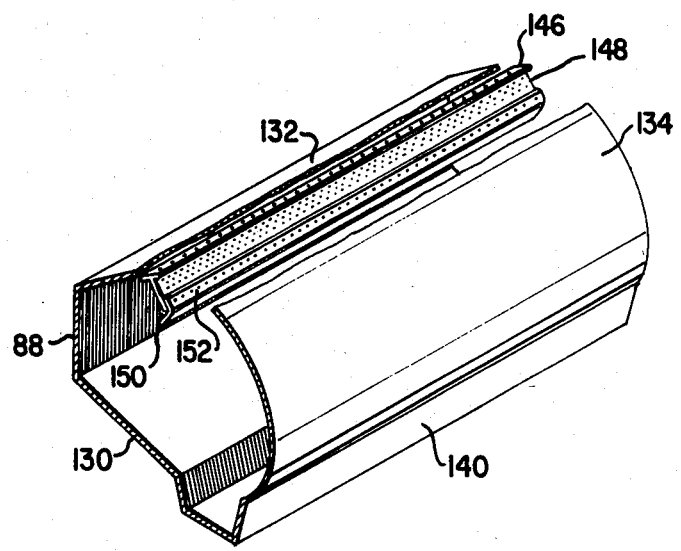
FIG. 4 is a partial perspective view of the housing of the collector device.

FIG. 3 is a cross sectional view of housing portion 74 taken along line 3—3 of FIG. 2. Flexible hose 92 is secured to the flange 130 of aperture 90 and housing portion 74 includes upper planar portion 132 which merges into semi-cylindrical portion 134. Below flange 130, housing portion 74 includes downwardly extending planar portion 138 which merges into lower portion 140 which contains and provides housing for a dual flight auger to be described more fully herein. Lower portion 140 extends upwardly and merges with portion 134 at point 142. Secured to the inside of upper planar portion 132 by suitable means such as screw or bolt fasteners 144 is plate 146 which has downwardly extending perforated plate 148 with seal means 150 secured by bolt means 152 to the lower end thereof. The seal means 150 extends the full length of housing portion 74 and may take the form of flexible belt means.

Within housing portion 74 is screen drum 160 which is mounted on shaft 110 concentric with housing portion 134, drum 160 having small holes or perforations 162 substantially about its peripheral between ends 164 and 166. Drum 160 is supported on shaft for rotation therewith by diametric drum supports 168 which each have apertured collar 170 through which shaft 110 extends. Drum 160 is removably secured to shaft 110 by suitable means associated with collar 170 such as an Allen screw. End 164 of drum 160 is closed by end cover 172 shown in FIG. 5 and in dotted lines in FIG. 6 which cover is suitably secured to end 166 by welding or other fastening means, not shown. Shaft 110 extends through end cover 172 at aperture 174 therein.

The other end 166 of drum 160 is open with the exception of associated support 168.

Within cylindrical housing portion 82 are cross braces 180 which are secured by welding or the like to the inner periphery of housing portion 82 for the purposes of supporting the end of shaft 110 in bearing means 182. Air is permitted to flow inwardly through holes 162 of drum 160 and then axially along the drum through end 164 and through housing 82 into smaller outlet housing 84 as shown in FIG. 5.

Figure 5:
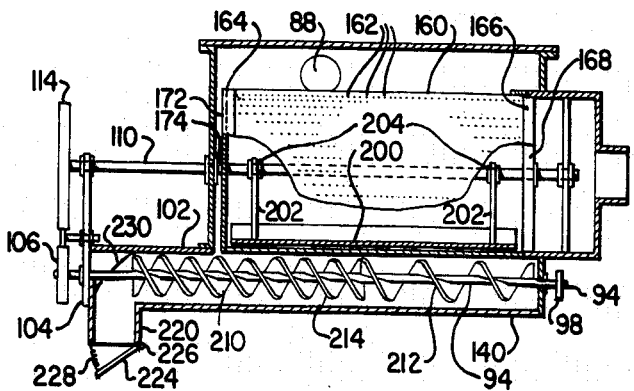
FIG. 5 is a longitudinal sectional view of the collector device.
Figure 6:
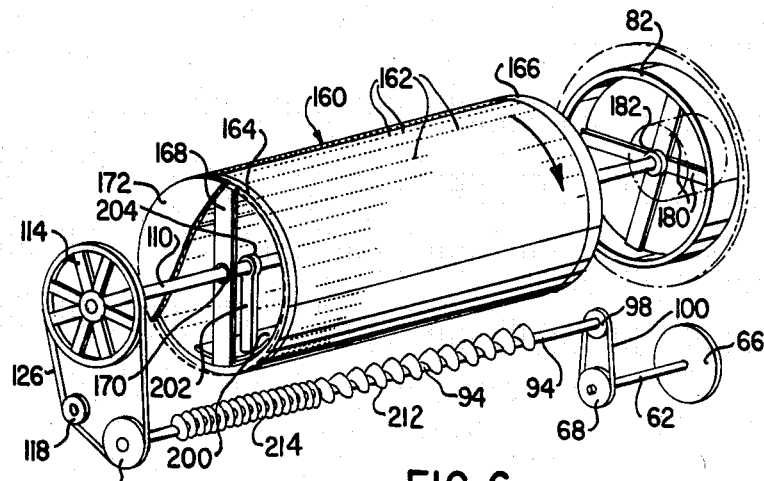
FIG. 6 is a perspective view of the rotating screen auger and related pulley apparatus.
Figure 7:
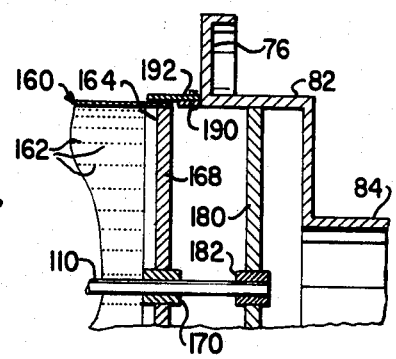
FIG. 7 is a partial sectional view enlarged from FIG. 5 showing the seal of the screen drum.

FIG. 7 is an expanded view of a portion of FIG. 5 showing flange 190 extending axially inwardly of said cylindrical portion 82, flange 190 providing of end portion 164 of drum 160.

Returning to FIGS. 5 and 6, cut-off plate 200 is freely suspended by supports 202 which are journalled to shaft 110 through bearings 204. Cut-off plate 200 has an arcuate configuration so that it assumes the position simply by gravity, closely adjacent the bottom of drum 160 (but without touching the drum), as shown in FIG. 3 and has an arcuate extent sufficient to effectively close off that portion of the drum 160 directly above lower housing portion 140.

Auger 210 is mounted on shaft 94 and extends the length of lower housing portion 140 and into auger housing 102. Grain or like material falling into lower portion 140 of housing 74 is augered into housing 102 which housing closely surrounds the associated flights of auger 210. Auger 210 preferably has a single flight section 212 and a double flight section 214.

Extending downwardly through the bottom portion of auger housing 102 is chute means 220 having bottom opening 222. A spring biased door 224 is hinged at 226 and is biased to a closed position by spring 228 to normally close opening 222. Material deflection plate 230 directs material toward opening 222.

In the operation of collector device 10, engine 30 provides driving power through the pulley mechanism shown in FIG. 2 to drive suction fan 40 and shaft 94. Rotation of shaft 94 is coupled to rotation of shaft 110 which rotates drum 160 within housing 74. Fan 40 sucks air into housing portion 74 through flexible hose 92 and any grain or fertilizer particulate material would be sucked in with this air. The material and air enter housing portion 74 through neck aperture 90, screen drum 160 separating the material from the air and dust, the latter travelling through screen drum 160 and outwardly through portions 82 and 84 into the inlet 46 of suction fan 40. Air is expelled through fan outlet 44. Particulate material falls by gravity to lower housing portion 140. Cut-off plate 200 reduces air suction through screen 160 in the vicinity of lower housing portion 140 and allows particulate material to fall into portion 140 to be augered axially toward housing 102 by auger 210. Any chaff and smaller particles of material which adhere to the surface of the drum are removed by flexible seal and belting member 150 as drum 160 rotates. It will also be appreciated that material entering housing 74 may also be deflected downwardly by perforated plate 148, the perforations of this plate being similar to those of drum 160. As particulate material accumulates in lower housing portion 140, it is augered into housing 102 and fills housing 102 completely to provide an air lock initially enhanced by the spring biased closure door 224. As the quantity of material within auger housing 102 builds up to complete the air lock, door 224 is forced open against the bias of spring 228 thereby allowing the material to exit the collector and be distributed.

Accordingly the invention has provided a new and simple mechanism for removing particulate material, such as grains or fertilizer from one location and provides for distribution elsewhere. It will be appreciated that suction air can be generated from most any high volume suction fan driven by any means notwithstanding that a gas engine has been shown in the present embodiments. It will also be appreciated that the suction fan could be built integral with the outlet portion 84 in housing 74 without detracting from the essence of the invention.

Once particulate material such as grain has entered collector 10, it passes through spinning screen drum 160. The screen drum 160 has sufficiently small perforations to substantially allow only air and dust to enter and be discharged out the fan exhaust 44. Rubber belting 150 rubs slightly on the outer periphery of the screen 160 and removes any chaff or dust buildup.

During start-up of the collector 10 the spring biased door 224 prevents air being sucked into collector 10 otherwise than through flexible hose 92 and during distribution of material from chute means 220 through opening 222, the material within housing 102 and partially within the adjacent lower housing portion 140 provides an air lock to prevent air from entering the collector 10, through open chute 220.

Although it will be apparent to those skilled in the art that various sizes of collector 10 are possible, one very successful exemplary embodiment has a screen drum diameter of 24" and an auger diameter of about 6". A 14 h.p. Kawasaki engine rated at 3500-4000 rpm was used to operate, through appropriate pulleys, the suction fan (an REM turbo blower) at about 4200 rpm, the auger at 660 rpm and the screen at 160 rpm. Tested on fall wheat (@62 lbs to the bushel) approximately 1500-2000 bushels per hour were distributed.

The collector system does not have paper or like filters requiring periodic stoppage to clean and accordingly there is very little, if any, chance of damage to the system by chaff or small foreign particles. The device has few moving parts, is lightweight with low maintenance requirements. The collector can be operated by any power source such as an I.C. engine, electric motor or PTO coupling.

Various modifications of the invention will become apparent to those skilled in the art and the invention is accordingly not limited to the preferred embodiment only but includes those modifications and variations within the scope and spirit of the appended claims.

The embodiments of the invention in which an exclusive property or privilege is claimed are defined as follows:

1. A particulate material collecting and distributing device, comprising:
   (a) a generally cylindrical, horizontally oriented, elongate closed housing (74) including a downwardly extending, elongate, bottom collecting trough (140), particulate material and air inlet means (90), and air outlet means (84), said inlet means and air outlet means being above said collecting trough and said outlet means being adapted to be connected with air suction generating means (40);
   (b) particulate material outlet means (220) separate from said inlet means and spaced from said collecting trough;
   (c) a rotatable cylindrical screen drum (160) fixedly mounted on a generally horizontally disposed shaft (110) within said housing for screening air flow between said inlet means and said air outlet means to separate the air from the particulate material such that the particulate material collects in said bottom trough, said screen drum being closed at one end and open at its other end, the open end of said screen drum being in substantially rotatably sealed communication with said air outlet means;
   (d) means associated with said screen drum for restricting air flow therethrough adjacent said collecting trough, said air flow restricting means including a downwardly depending cut-off plate (200) suspended within said screen drum from said shaft by journals (204);
   (e) auger means disposed within the collecting trough for conveying material from said trough to said material outlet means;
   (f) means for rotatably driving said auger means and said screen drum shaft at selected relative rotational speeds;
   (g) said material outlet means including means (224) which prevents air from entering said housing therethrough during start-up operation of said device and which, in conjunction with material being conveyed to said particulate material outlet means for discharge outside said device, creates an air lock to substantially prevent air entering said housing through said material outlet means while material is being discharged therefrom; and
   (h) a perforated deflector plate (148) extending from an interior surface of said housing means adjacent said inlet means toward said screen drum for deflecting particulate material toward said collecting trough.

2. The particulate material collecting and distributing device according to claim 1 wherein said preventing means includes an extension chamber (102) axially adjacent but exterior to said collecting trough and closely housing an end portion of said auger means, said material outlet means being adjacent an outer end of said extension chamber and including a hinged door means (224) biased to a closed position, said door means being forced open by particulate material being augered from the collecting trough of said housing and through said extension chamber, and said auger means including a portion (214) having double flights which portion extends at least within said extension chamber.

3. The particulate material collection and distribution device of claim 1 or 2, including air suction generating means (40) associated with said air outlet means, said means (30) for driving said auger and said screen drum shaft including means to drive said air suction generating means.

* * * * *